United States Patent

Hill, III

[15] 3,681,759

[45] Aug. 1, 1972

[54] DATA LOOP SYNCHRONIZING APPARATUS

[72] Inventor: John Dan Hill, III, Dallas, Tex.

[73] Assignee: Collins Radio Company, Dallas, Tex.

[22] Filed: Aug. 6, 1970

[21] Appl. No.: 61,559

[52] U.S. Cl...................................340/172.5, 179/15

[51] Int. Cl.................................................H04j 3/08

[58] Field of Search.....179/15 AL, 15 BS, 15 AT, 15 A, 179/15 AQ; 340/172.5; 178/50, 53; 307/208; 328/59, 60, 63

[56] References Cited

UNITED STATES PATENTS

| | | | |
|---|---|---|---|
| 3,529,089 | 9/1970 | Davis et al. | 179/15 |
| 3,483,329 | 12/1969 | Hunkins et al. | 179/15 |
| 3,560,937 | 2/1971 | Fischer | 340/172.5 |
| 3,478,171 | 11/1969 | Shimasaki et al. | 178/50 X |
| 3,529,089 | 9/1970 | Davis | 179/15 |
| 3,483,329 | 12/1969 | Hunkins | 179/15 |
| 3,560,937 | 2/1971 | Fischer | 340/172.5 |
| 3,478,171 | 11/1969 | Shimasaki | 178/50 X |
| 3,517,130 | 6/1970 | Rynders | 179/15 AL |

FOREIGN PATENTS OR APPLICATIONS

| | | | |
|---|---|---|---|
| 1,183,439 | 3/1970 | Great Britain | 179/15 |

*Primary Examiner*—Paul J. Renon
*Assistant Examiner*—Ronald F. Chapuran
*Attorney*—Robert J. Crawford and Bruce C. Lutz

[57] ABSTRACT

Apparatus for use with a multichannel, time division multiplex, multidata rate closed data loop to variably compensate for delays incurred during circulation of the data bits around the loop. Incoming data is stored and retransmitted to the loop whereby the retransmission of data bits in a given data rate channel time slot occurs an integral number of time slot repetition periods after original transmission of data in that channel time slot.

13 Claims, 12 Drawing Figures

INVENTORS.
JOHN DAN HILL

BY Bruce C Lutz
ATTORNEY

INVENTORS.
JOHN DAN HILL

BY Bruce C Lutz
ATTORNEY

INVENTORS.
JOHN DAN HILL

BY Bruce C Lutz
ATTORNEY

INVENTORS.
JOHN DAN HILL

BY Bruce C Lutz
ATTORNEY

INVENTORS.
JOHN DAN HILL
BY Bruce C Lutz
ATTORNEY

INVENTORS
JOHN DAN HILL

BY Bruce C Lutz
ATTORNEY

INVENTORS.
JOHN DAN HILL
BY Bruce C Lutz
ATTORNEY

INVENTORS.
JOHN DAN HILL

BY Bruce C Lutz
ATTORNEY

DATA LOOP SYNCHRONIZING APPARATUS

The present invention is directed generally towards electronics and more specifically toward a means for synchronizing data bits circulating in a closed loop system.

Where data bits are circulated through a plurality of processing units in a closed loop system, delays are incurred. If the system is designed to operate on a multichannel, multiaddress basis, there needs to be some sort of synchronism so that a particular line unit, connected to the loop, will always obtain data from the loop at a given point in time or time slot with respect to a synchronizing signal. With the delays incurred upon passage through the various units, the chance is very small that data will have a total delay of the right amount so that it will be in the proper time slot on each circulation. If this data is not in the proper time slot, the receiving units or processors will not be able to maintain the capability of selecting a particular data channel. A solution is to utilize a data bit synchronizer which will provide a variable delay, depending upon the delay in the remaining units connected to the loop, so that the total delay from first transmission to retransmission of the data in a particular time slot remains at an integral number of data bit repetition periods. This delay correction is called loop synchronization. The loop synchronization becomes more important as data bits are intermixed in time multiplexing systems and wherein the data bit rates are different for adjacent time channels.

It is therefore an object of the present invention to provide a loop synchronizing means for use with a closed loop time division multiplex network having a plurality of channels and which may utilize a plurality of data rates.

Other objects and advantages of the present invention will be apparent from a reading of the specification and appended claims in conjunction with the drawings wherein:

DETAILED DESCRIPTION OF ENTIRE LOOP SYNCHRONIZER

Figure 1:
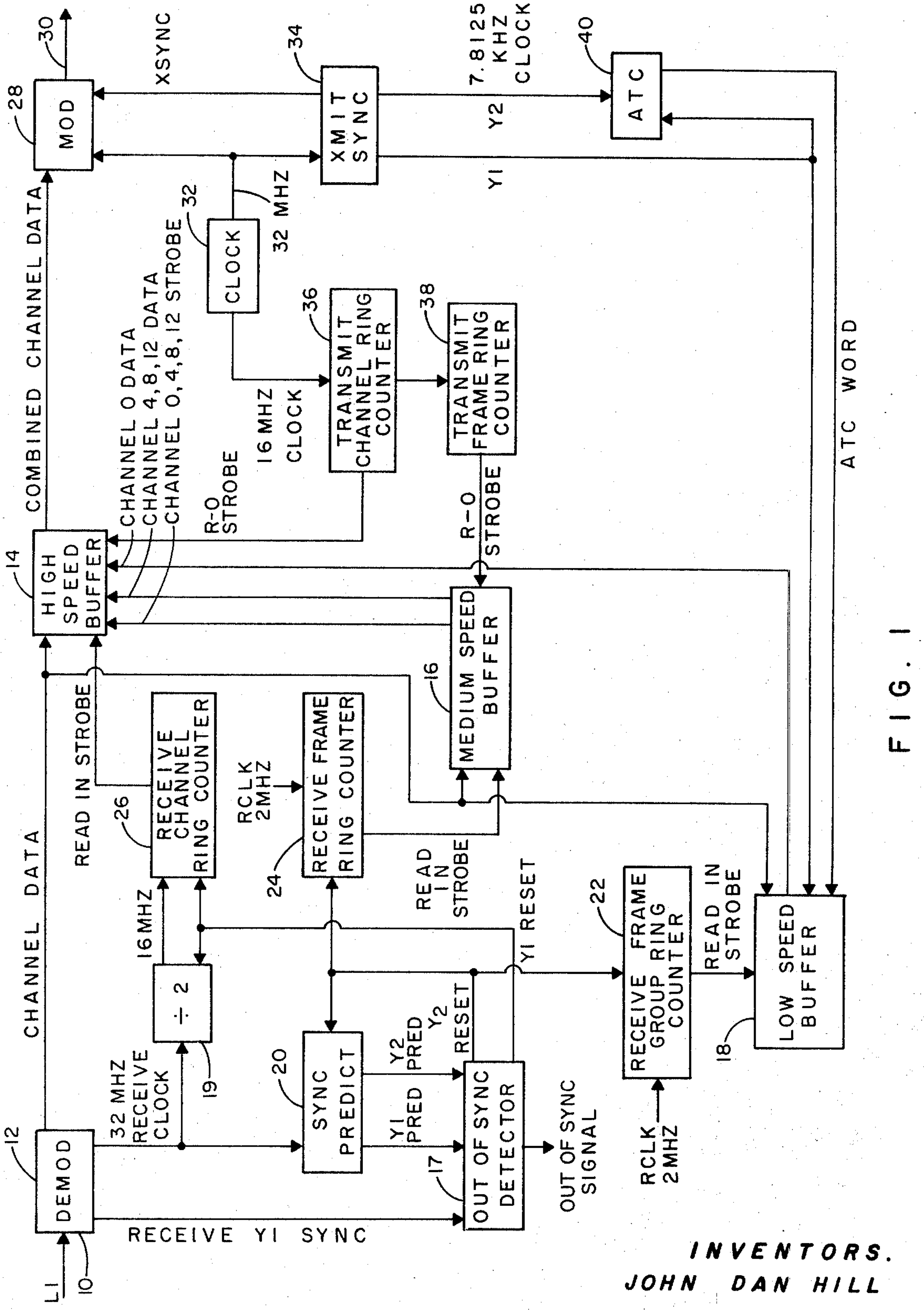
FIG. 1 is a block schematic diagram of the complete loop syn-chronizer.

In FIG. 1 input signals are applied at input terminal 10 which is also labeled L1 and is connected to a demodulator 12. Demodulator 12 has a channel data output supplied to a high speed buffer 14, to a medium speed buffer 16 and to a low speed buffer 18. Demodulator 12 further supplies Y1 sync pulses to an out-of-sync detector 17 and supplies 32 MHz receive clock signals to a divide by two network 19 and a sync predict circuit 20. The 32 MHz signals as well as any other frequencies or specific circuits mentioned in the specification are for explanatory purposes only as they were used in a particular embodiment of the invention and are not to be deemed respective. The sync predict circuit 20 supplies Y1 and Y2 predict signals to the out-of-sync detector 17 which supplies Y2 reset output pulse to the sync predict circuit 20, to a receive frame group ring counter 22 and to a receive frame ring counter 24. The out-of-sync detector 17 also supplies a Y1 reset pulse to the divide by two circuit 19 and to a receive channel ring counter 26. The divide by two circuit 19, after dividing the 32 MHz received clock, supplies this signal to the receive channel ring counter 26. Receive channel ring counter 26 provides a read in strobe to the high speed buffer 14. The receive frame ring counter 24 supplies a read in strobe pulse to the medium speed buffer 16. 2 MHz RCLK pulses are supplied to a further input of receive frame group ring counter and to receive frame ring counter 24. An output of frame group ring counter 22 supplies a read in strobe to the low speed buffer 18. The high speed buffer 14 supplies an output containing the combined channel data to a modulator 28 which supplies a further output on lead 30. The modulator 28 is supplied with clock pulses from a clock means 32 which also supplies clock signals to a transmit sync 34 and to a transmit channel ring counter 36. The transmit channel ring counter supplies an output strobe to the high speed buffer 14 as well as supplying a clocking pulse to a transmit frame ring counter 38. Ring counter 38 supplies a read out strobe to medium speed buffer 16 which supplies a strobe to the high speed buffer 14 for channels 0, 4, 8, and 12. It also supplies data to the high speed buffer 14 for channels 4, 8, and 12. An output of the transmit sync 34 is supplied to clock an ATC or Absolute Time Clock block 40 as well as supplying synchronizing signals to the low speed buffer 18. A Y2 output from transmit sync 34 also supplies clocking signals to ATC block 40 at 7.8125 kHz. An output of ATC block 40 supplies an ATC word input to the low speed buffer 18. The low speed buffer 18 supplies an input to the high speed buffer 14 for channel 0 data. The out-of-sync detector 17 supplies a further output which provides an indication when the loop synchronizer is out of sync.

The various ring counters may be any applicable design such as shown in a co-pending application titled "Ring Counter Apparatus" in the names of Watson and Escoffier, Ser. No. 54,959, filed July 15, 1970.

LOOP SYNCHRONIZATION OPERATION

The operation of the loop synchronizer is relatively straightforward in a broad sense in that it operates to take data received on terminal 10 and store it in the buffers 14, 16, and 18; and then retransmit this data through the auspices of modulator 28 to the output line 30 at a time later which corresponds with an integral number of data bit repetition periods after original transmission of data in that time slot.

The actual embodiment of the invention utilized bi-phase modulated and amplitude modulated data bit stream and therefore an explanation will be provided using this type of input as an example. However, the loop synchronizer is not limited to such waveforms and may be applicable to other types of data waveforms.

The incoming information is demodulated in 12 and all of the data bits are stored in buffer 14. The medium speed buffer receives all the data bits for channels 0, 4, 8, and 12 while the low speed buffer 18 receives only the data bits for channel 0. The reception of these data bits is obtained by the various read in strobes. In other words, the high speed buffer 14 is clocked every fourth data bit reception period and the low speed buffer 18 is clocked or strobed every 16 bit reception period.

The format of the data bits used in the overall loop to which the loop synchronizer is connected is that there are 16 channels of data with each particular channel occurring every 16 data bits. The 16 channels comprise a frame of channels. For every 16 frames, a frame sub-group occurs. Every 16 frame subgroups or every 256 frames, a frame group occurs.

Using this information as background material it is desired to make the delay around a data loop equal to one or more integral numbers of frames of high speed information while the data in the medium speed buffer 16 is delayed one or more integral number of frame subgroups and while the data in the low speed buffer 18 is delayed one or more integral number of frame groups. The demodulator 12 takes the incoming signal and obtains from the amplitude modulated portion thereof a 32 MHz receive clock signal which is divided down to strobe the high speed buffer. The received information has two types of amplitude modulated synchronizing signals, one of which is indicative of the occurrence of a frame while the other is indicative of the occurrence of the end of a frame group. These two signals which are designated as Y1 and Y2, respectively, are utilized in a sync predict circuit 20 in combination with an out-of-sync detector 17 to reset the receive channel ring counter 26 to commence counting at the beginning of a frame thereby placing the first channel data bit in the first stage of the high speed buffer 14 and to reset the receive frame ring counter and the receive frame group ring counter so that they commence at the beginning of a frame group to start placing the first or channel 0 data bits in each of the medium speed and low speed buffers 16 and 18, respectively. In later operation it will be determined that the channel 0 data placed in each of the three buffers is transmitted out of only the low speed buffer 18 and is merely ignored by the buffers or registers 14 and 16 even though contained therein.

The clock for the entire loop is contained in block 32. Thus, this clock must be kept very stable. This clock produces the Y1 and Y2 signals which are received and demodulated at the end of the loop by demodulator 12. In operation the Y1 and Y2 signals may be divided out of the 32 MHz generated signal so that a Y1 pulse occurs every 16 data bits or clock pulses and Y2 occurs every 4,096 bits. The clock is applied directly to the modulator 28 so that each received bit of data is clocked out to line 30. The clock is also supplied to the transmit sync 34 which amplitude modulates certain data bits every 16 bits thereof and differently modulates every 4,096 bit to provide the coded frame group synchronization. The clock 32 also supplies signals to the transmit channel and frame ring counters 36 and 38 and through the transmit sync 34 supplies an output transmit signal to the low speed buffer 18. These clock signals are utilized by the associated buffer devices 14–18 to supply their stored signals to the modulator 28 at the appropriate time.

The ATC block 40 is not a necessary part of the invention but is provided merely to supply information as to time on a periodic basis for statistical and real time reference purposes.

DEMODULATOR

Figure 2:
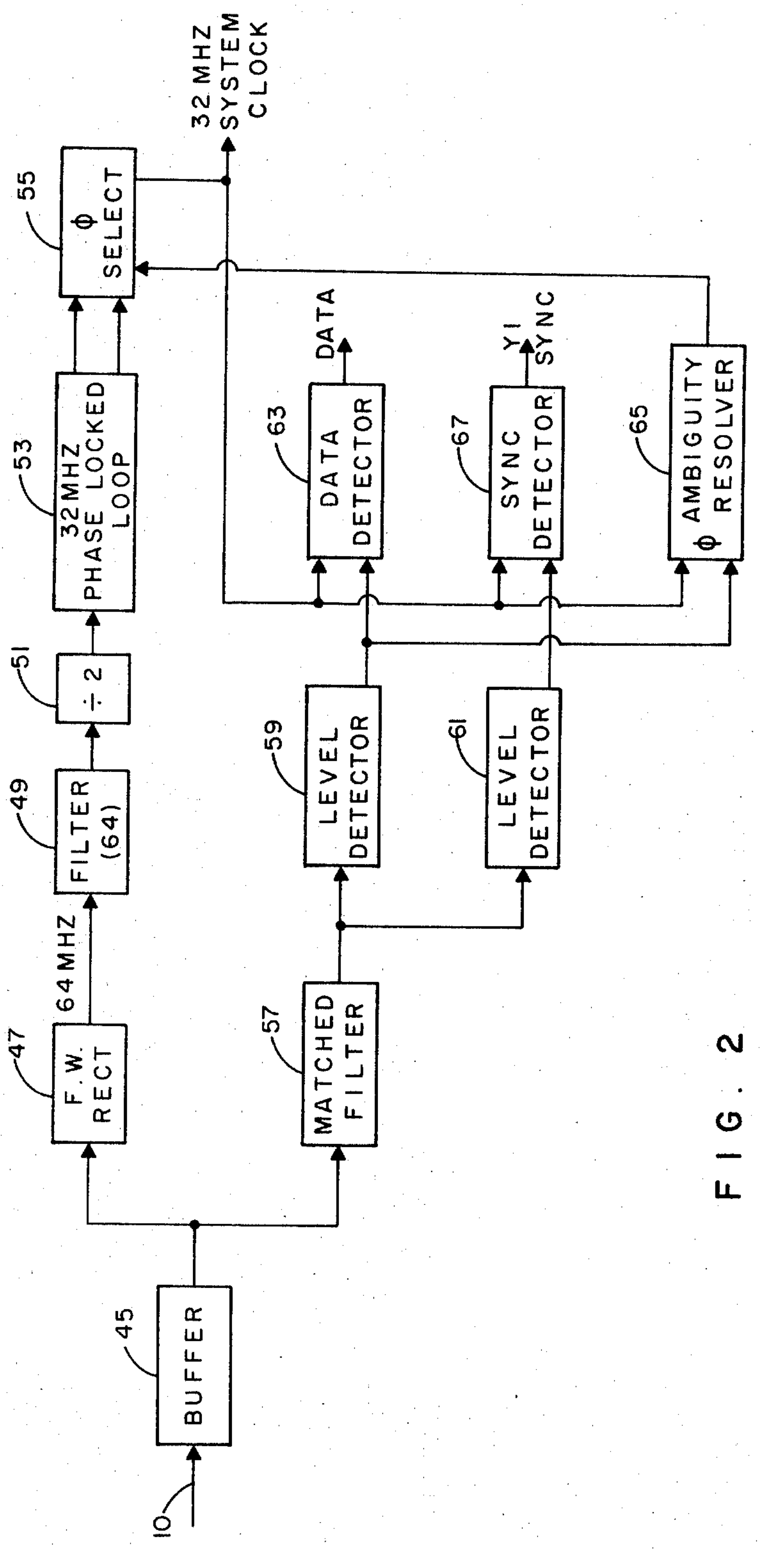
FIG. 2 is a block schematic diagram of the demodulator section of the loop synchronizer.

In FIG. 2 a detailed block diagram is shown of the demodulator 12 in FIG. 1. The incoming data on line 10 is basically that as shown in waveform A of FIG. 3. This data is isolated by buffer 45 supplied to a full-wave rectifier 47 which produces a frequency doubling effect in the signal. This is filtered at 64 MHz by a filter 49 and then again divided by two in block 51 to supply a 32 MHz signal to a phase lock loop 53. This signal is full of harmonics and possible phase jitter caused by noise. However, the phase lock loop 53 removes the harmonics and phase jitter therefrom and supplies two out-of-phase signals to a phase select 55. These two out-of-phase signals are relatively free of the incoming harmonics. The signal from buffer 45 is also supplied to a matched filter 57 which alters the incoming signal from that shown in waveform A of FIG. 3 to that shown in waveform B of FIG. 3. The filter may be designed according to the principles outlined in various network synthesizing publications but primarily is a filter designed to have an impulse response of a single cycle of a sine wave. The output of filter 57 is supplied to a pair of level detectors 59 and 61. These two level detectors provide outputs when the inputs exceed different predetermined levels in either the positive or negative direction with respect to a reference. These levels may be shown or illustrated by the dash lines in waveforms B and R of FIG. 3 and the outputs of the level detectors are illustrated in waveforms C and S, respectively.

The output of level detector block 59 supplies an input to a data detector 63 and also supplies an input to ambiguity resolver 65. The level detector means 61 supplies an output to a sync detector 67 which receives an input from phase select circuit 55. Phase select circuit 55 also supplies inputs to data detector 63 and an ambiguity resolver 65, as well as providing a 32 MHz system clock output. All of the blocks referenced above are old in the art with the possible exception of blocks 63–67. These blocks will be explained further below.

AMBIGUITY RESOLVER

Figure 3:
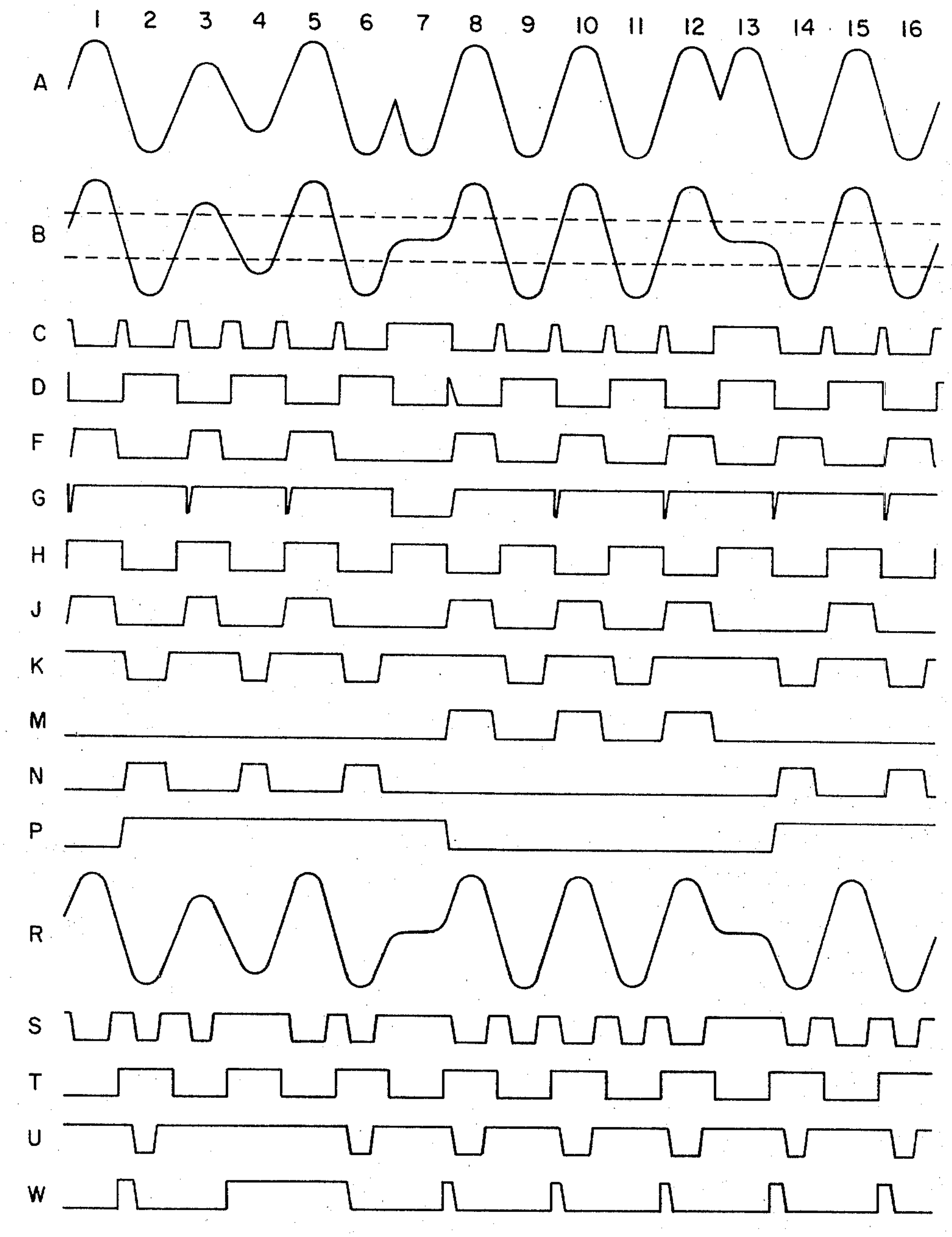
FIG. 3 is a set of waveforms for use in explaining FIGS. 1 and 2.
Figure 6:
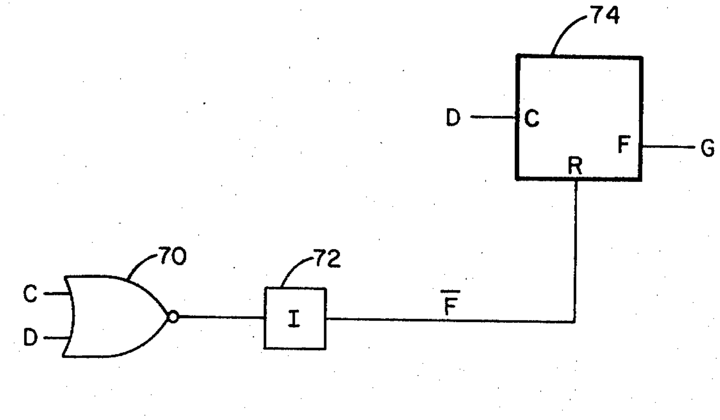
FIG. 6 is a detailed block diagram of the ambiguity resolver of FIG. 2.

The ambiguity resolver 65 will be better understood from a discussion of FIG. 3 and FIG. 6. The ambiguity resolver is designed to correct the phase of the system clock being supplied by the demodulator. If the phase of the system clock is incorrect, the data bits will be reversed in polarity and therefore the information will be inverted. This will of course result in errors through out the system.

As previously suggested, waveform C in FIG. 3 is positive when waveform B does not exceed the dash line levels shown. The is the function of the level detector and can be performed by any of a variety of amplitude detection units.

Waveforms C and D (D being a clock signal from the phase select circuit 55) are combined in NOR circuit 70 of FIG. 6 to produce an output which is shown as waveform F in FIG. 3. This waveform is inverted by an inverter 72 to produce $\overline{F}$ or the false output of the NOR circuit 70. This signal is in supplied to a reset input of a JK flip-flop 74 where, in combination with the clock of waveform D, and output shown as G is obtained. It will be noted that the F output becomes positive when, and only when, both of the inputs C and D are negative. The $\overline{F}$ output is the inverse of the F output shown and this signal tends to reset the flip-flop so that when $\overline{F}$ goes negative the output of the flip-flop is reset to go positive. The flip-flop is originally set in a negative condition by the input clock signal D. The output waveform G as may be ascertained is normally a very narrow pulse except when there is a reversal of phase of the input data and the phase is erroneous. As may be ascertained from waveform A the phase reversal occurs between time periods 6 and 7 of FIG. 3, and since the clock is of the wrong phase a wide pulse is produced in waveform G which may be supplied through an integrating circuit to the phase select circuit 55 of FIG. 2 to reverse the phase of the output as is shown at the beginning of time period 8 in waveform D. The integrating circuit would, of course, ignore the very narrow pulses at the beginning of time periods 1, 3, 5, etc. The integrating circuit is not shown since this can be easily designed and incorporated in the phase select circuit 55.

DATA DETECTOR

Figure 7:
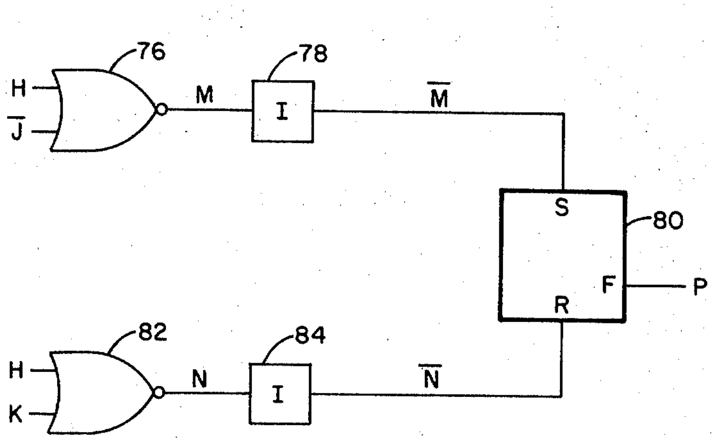
FIG. 7 is a detailed block diagram of the data detector of FIG. 2.

The explanation of the data detector 63 of FIG. 2 may be clarified from an examination of waveforms H-P of FIG. 3 in conjunction with FIG. 7. For this explanation it will be assumed that the clock signal is of the correct phase and it is therefore redrawn as waveform H. Waveform J represents the time that waveform B exceeds the positive level represented by the upper dash line in waveform B. This output can be easily obtained by a low hysteresis, level detecting circuit. If two level detectors are used for detector 57 of FIG. 2, only one of these (the positive detection circuit) would supply information to data detector 63 while both of them would supply signals to ambiguity resolver 65. However, the connection lines of FIG. 2 merely show signal flows, not how many signals are flowing in a particular line.

The circuit of FIG. 7 combines the waveforms H and $\overline{J}$ (which is the false or inverted waveform J) in a NOR circuit 76 to produce waveform M which is positive whenever H and $\overline{J}$ are negative. This signal is inverted in inverter 78 and applied to a set input of a JK flip-flop 80. The K waveform in FIG. 3 is negative when the waveform B exceeds the lower limit level. Again, such a level detector may be designed on the same basis as described above. The signals shown as waveforms H and K are combined in a NOR circuit 82 to produce the waveform N which is positive whenever waveforms H and K are negative. This waveform N is inverted in inverter 84 and applied to a reset input of the flip-flop 80. An output P is illustrated which becomes positive whenever a negative $\overline{N}$ signal is applied to the reset input. This output stays in this condition upon the application of further $\overline{N}$ input pulses until it receives an $\overline{M}$ input pulse at the set input. At this time the output goes negative until receiving a further $\overline{N}$ negative-going input pulse.

Thus, it may be determined that the data detector produces an output which is supplied to the high speed buffer 14 which provides a change in output upon each change in phase of the input signal. This change of phase as previously indicated, is representative of a change of input information from a L1 (logic 1) to a L0 (logic 0) or vice versa. It will be noted that there is a one-half cycle phase delay in signal P with respect to the change in phase of waveform A. In actual practice there is more delay in signal than is shown but these delays can be compensated for by standard engineering techniques and procedures and would only further complicate the description to have an accurate representation of such delays in this disclosure.

It will be ascertained, however, that the information on the channel data lead going to the various buffers remains in a positive or non-return to zero condition as long as there are L1 inputs and in a negative condition when there are L0 bits of input information. These positive or negative inputs may be used in conjunction with the actuation of various consecutive stages in the storage registers to store data channel bit information therein.

SYNC DETECTOR

Figure 8:
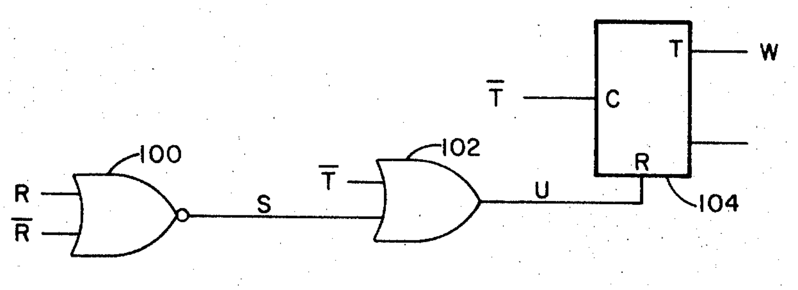
FIG. 8 is a detailed block diagram of the synchronization detector of FIG. 2.

The sync detector 67 of FIG. 2 may be further understood from an examination of FIG. 3, waveforms R-N and FIG. 8. Waveform R is basically waveform B with different dash line level detection limits. However, the two level detection limits are set differently as may be seen in time periods 3 and 4 during the occurrence of a Y1 sync pulse. Waveform S is a waveform which is positive whenever the waveform R is less than the dash line limit for a given polarity. The inputs R and $\overline{R}$ in FIG. 8 are indicative of the already level detected outputs of two level detectors in detector 61 of FIG. 2 representing the positive and negative portions. These signals are supplied to an OR gate 100 whose output is supplied to an OR gate 102. The OR gate 102 also receives an input $\overline{T}$ which is the inverse of the waveform T as shown. The output U is a signal which becomes negative or a L0 whenever both of the inputs S and $\overline{T}$ are negative or a L0. This output is applied to the reset input of a JK flip-flop 104. Flip-flop 104 has a $\overline{T}$ signal supplied to the clock input thereof so that the output W is clocked to a positive value upon the negative-going portion of the $\overline{T}$ input and is reset to a negative value upon the application of a U input.

The incoming signal is amplitude modulated as previously indicated so that a Y1 pulse is signified by a reduction in amplitude of the incoming signal. This reduction in amplitude is shown in time periods 3 and 4 in FIG. 3. As previously indicated this occurs every 16 bits of data information. Every 4,096 bits of data information or every 256 frames the time slot indicative of 3 and 4 is not amplitude modulated and this indicates the Y2 sync pulse. In other words, the apparatus must obtain synchronization through a reduction in amplitude for the Y1 pulse and then when the apparatus is in synchronization with Y1, adjusts itself so that it realizes a Y2 pulse has occurred whenever it expects a Y1 pulse and does not receive same.

As may be determined, the W waveform is normally a series of very narrow pulses which becomes a single wide pulse of approximately one cycle in length every time a reduction in amplitude of the incoming signal occurs. Again, as explained in conjunction with waveform P, there is a delay in output with respect to the input. However, this delay is compensated for in the overall systems and is not pertinent to the invention. The long pulse can be again detected by an integrator means, which will ignore the short duration pulses, for providing the Y1 sync pulse to the out-of-sync detector.

SYNC PREDICT AND TRANSMIT SYNC CIRCUITS

Figure 10:
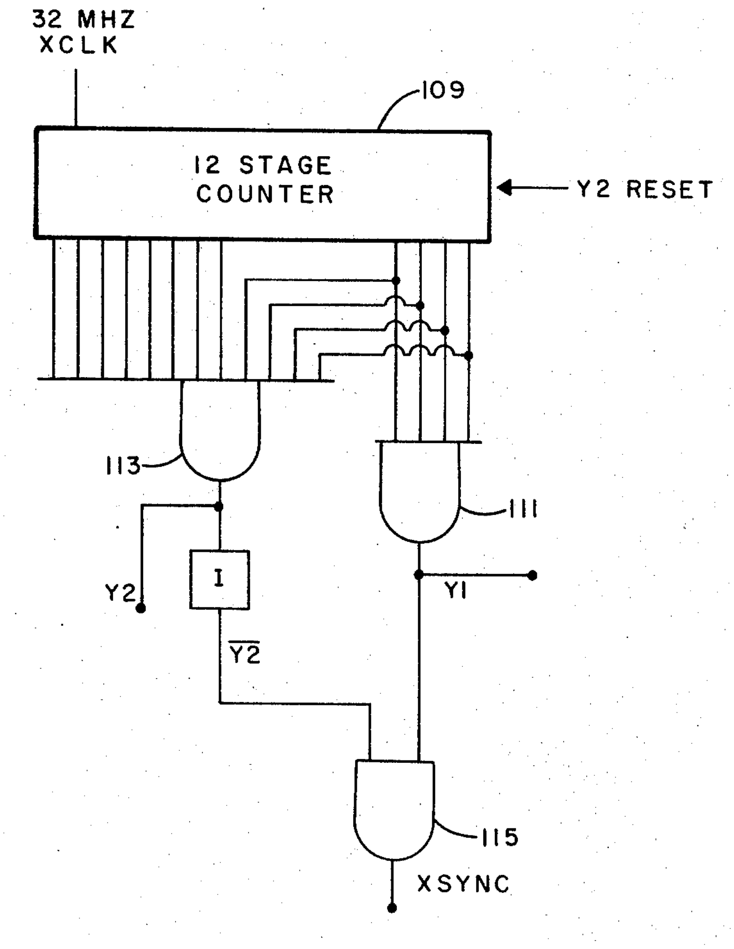
FIG. 10 is a generalized block diagram for the sync predict circuit or Xmit sync circuit of FIG. 1.

Both the sync predict and transmit sync circuits 20 and 34, respectively of FIG. 1, may be designed in substantially the same manner. A generalized block diagram is shown in FIG. 10. In both cases a 32 MHz input signal may be supplied to a 12 stage counter 109. The four least significant bits of the counter 109 are supplied to an AND gate 111 while all of the stages are connected to a 12 bit input AND gate 113. The counter 109 also has a Y2 reset input which will set the counter to an all 1's condition. This is simply accomplished by using JK flip-flop with the Y2 reset input connected to the set or reset terminal thereof. Since the first four stages of the counter 109 represent the binary equivalent of 16, the AND gate 111 will provide an output every 16 pulse of the 32 MHz clock. This may be used as the Y1 output signal. On the other hand, all of the stages of the counter 109 will have a "1" output only once every 4,096 input pulses. Since this is the repetition of the Y2 pulse, the output of AND gate 113 can be used to provide a Y2 pulse. The Y2 pulse may be inverted and applied to an AND gate 115 along with the Y1 pulse so that $\overline{Y2}$ is normally positive and in conjunction with a Y1 pulse provides a transmit signal to the modulator 28 to decrease the amplitude of the output signal. When a Y2 pulse occurrs, there will be a negative input on the $\overline{Y2}$ lead and therefore there will be no output to modulate modulator 28 at the Y2 sync pulse time.

For the transmit sync block 34, the Y2 reset input is not utilized and for use as a sync predict circuit 20, the AND circuit 115 is not utilized.

OUT OF SYNC DETECTOR

Figure 11:
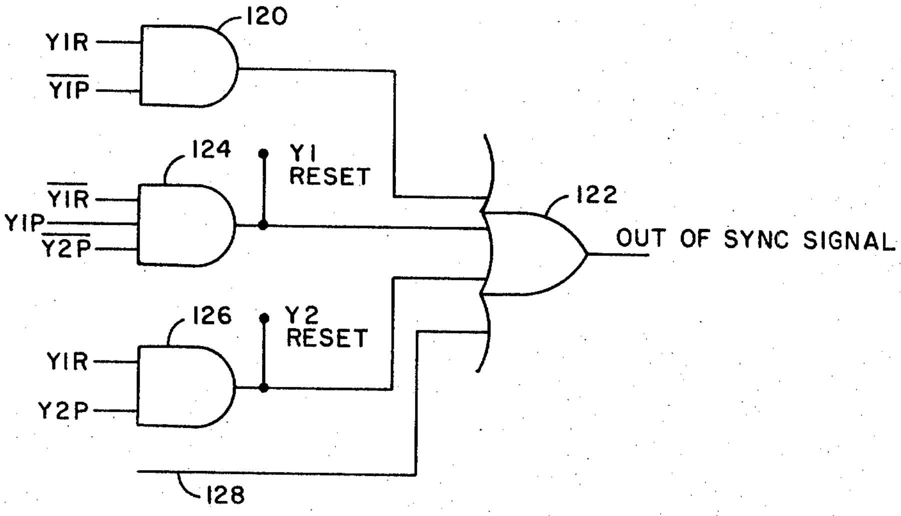
FIG. 11 is a block diagram of the out-of-sync detector portion of FIG. 1.
Figure 12:
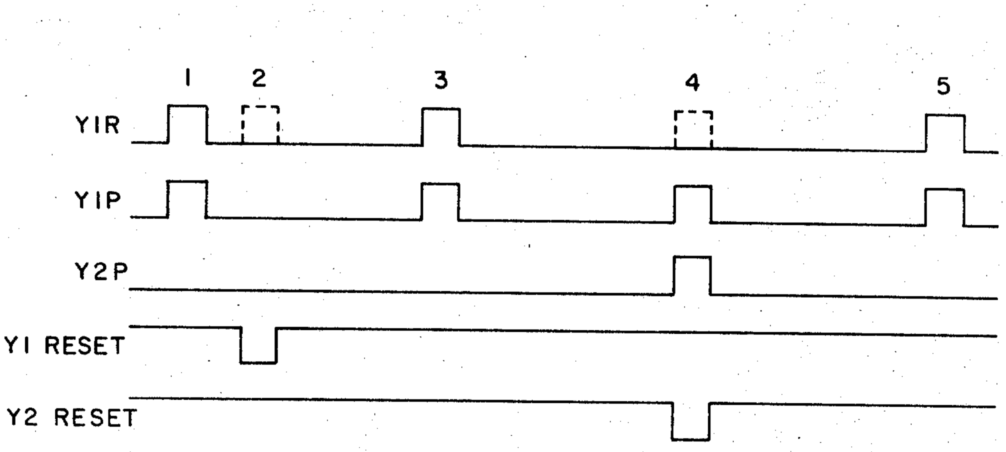
FIG. 12 is a set of waveforms for use in explaining FIG. 11.

The out-of-sync detector 17 of FIG. 1 may be better understood from an examination of FIGS. 11 and 12. In FIG. 11 a first AND gate 120 receives a Y1 receive (Y1R) input as well as a Y1 predict ($\overline{Y1P}$). These signals are shown in FIG. 12. An output of AND gate 120 is supplied to a first input of an OR gate 122 which provides an out-of-sync signal. A further AND gate 124 has a $\overline{Y1R}$ input as well as a Y1P and a Y2 predict signal ($\overline{Y2P}$). The output of this AND gate is a Y1 reset signal and is also supplied as an input to OR gate 122. A further AND gate 126 receives Y1R and Y2P input signals and provides a Y2 reset output which is also supplied to OR gate 122. A final input is provided on a lead 128 which is obtained from the ambiguity resolver to indicate an error in phase. This is not shown in the ambiguity resolver block diagram of FIG. 6 but is used primarily to allow complete resynchronization of the circuit for a period of time (approximately 30 milliseconds) after detection of the fact that the phase is in error. Each of the other occurrences indicating out-of-sync conditions may be used to provide this out-of-sync signal for the given period of time.

In operation the AND gate 120 will provide an output indicating receipt of a Y1 pulse when no such pulse should be obtained. This will also provide an output before the sync predict circuit 20 is operating in synchronism. However, it is primarily intended to produce an output when the system receives a Y1 pulse or other noise pulse at a time other than the predicted Y1 reception. Since Y1P is inverted to produce the $\overline{Y1P}$ input, it is always positive except when a Y1 pulse is predicted. At this time it goes negative so that the occurrence of a Y1 pulse will not produce an output. If a Y1 pulse is received at some other time an output is obtained to provide an out-of-sync signal.

The AND gate 124 receives the inverse of the Y1R and Y2P signals so that these signals are normally positive. Thus again, no output will be obtained at any time as long as the solid line waveform for waveform Y1R is obtained. This is because at no time are there three positive inputs to AND gate 124. However, if the system is not synchronized so that a Y1 pulse is received at time 2, all three inputs will be positive and a Y1 reset output will be obtained to reset the counter to an a11 Ll condition thereby changing the occurrence of Y1 for later time periods.

The AND gate 126 will normally provide no output since it is to detect only the instance when a Y2 pulse occurs at time other than when it is predicted. Since it is predicted to occur at time period 4, there will be no output as long as a Y1 pulse is not received. However, if the device is synchronus as far as the Y1 pulses are concerned but not as far as the Y2 pulses, an output Y1 pulse (V1R) will be received at time period 4 and an output will be obtained to reset the frame and frame group ring counters 24 and 22, respectively, as well as the counter of the sync predict circuit 20 so that the device will remain in synchronization as long as there are no further changes in the system. This Y2 reset pulse is shown in FIG. 12.

MODULATOR

Figure 4:
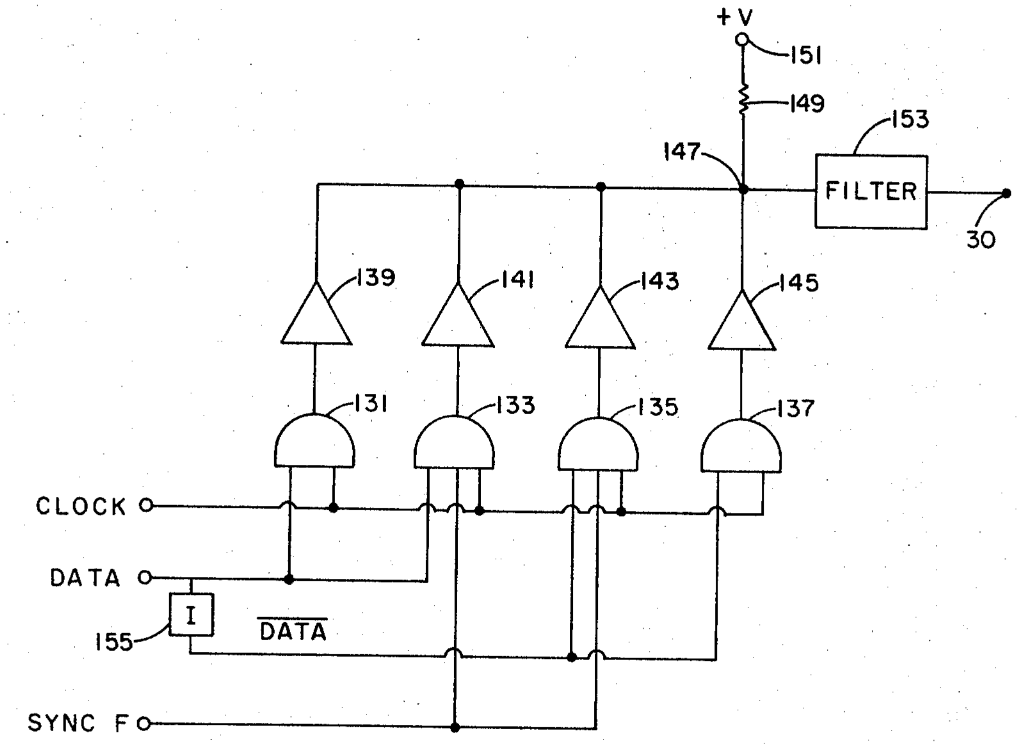
FIG. 4 is a block diagram of the modulator section of FIG. 1.
Figure 5:
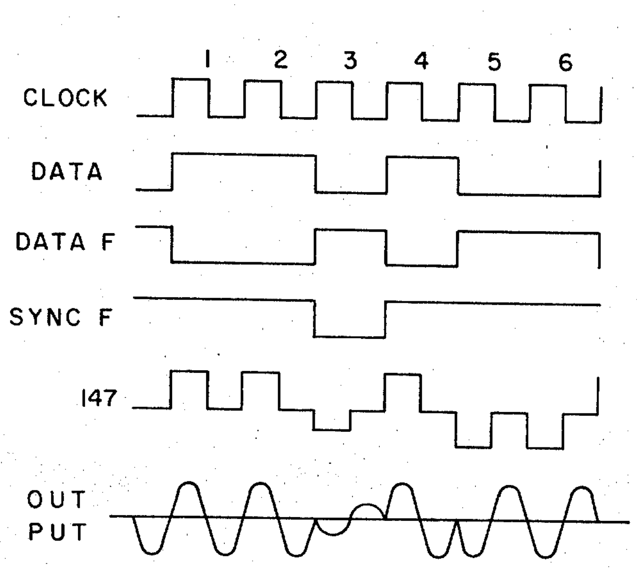
FIG. 5 is a set of waveforms for use in explaining FIG. 4.

The modulator 28 of FIG. 1 is shown in more detail in FIG. 4 and waveforms accompanying FIG. 4 are shown in FIG. 5. The clock input signals are shown supplied to each of a plurality of AND gates 131, 133, 135, and 137. The outputs of each of these AND gates are supplied to a plurality of amplifying means or buffering stages 139, 141, 143, and 145, respectively. The outputs of each of these amplifying means is summed together at a junction point 147 which is connected through a resistor 149 to a positive potential 151. The resistor 149 in conjunction with each of the amplifiers 139–145 is used for the purposes of summing to provide a combined signal to a filter 153 which has no output 30 as shown in FIG. 1. Such a filter is designed to have an impulse response of one-half cycle of a cosine wave which impulse response characteristic will product 1 cycle of sine wave out with a one-half cycle rectangular input signal. Incoming data is supplied to AND gates 131 and 133 while the data is inverted by inverter 155 to supply data false signals to AND gates 135 and 137. The signal indicative of sync false is supplied as a third input only to AND gates 133 and 135. The sync false signal would be the false version of the X or transmit sync signal shown as an input to modulator 28 in FIG. 1. In operation the data is shown in FIG. 5 in much the same fashion as shown in waveform P of FIG. 3. In other words, the AND gate 131 may be allowed to pass signals for more than one incoming clock pulse in succession. As shown, both AND gates 131 and 133 are turned to an ON condition for time periods 1 and 2 and thus their outputs are combined. However, for timer period 3, the sync false signal prevents either AND gate 133 or 135 from operating so that an output is obtained only from AND gate 137. This is illustrated by a reduced amplitude output for waveform 147. The rest of the time periods are believed to be self-explanatory.

These signals are supplied to filter 153. This filter is described in more detail in a U.S. Pat. No. 3,614,674 in the name of John D. Hill titled "Filter Apparatus" and assigned to the same assignee as the present invention. This filter takes a ternary-level pulsating square wave return to a 0 signal and converts this to a sine wave biphase amplitude modulated signal in accordance with the amplitude modulation of the waveform 147. The output 30 is as shown in the lower waveform of FIG. 5. It will be realized that the Y1 sync pulses result in approximately one-half to three-quarters amplitude output pulses whereas the Y2 sync pulses prevent the occurrence of a Y1 pulse and therefore full amplitude output signals are obtained during this bit of transmitted data.

HIGH SPEED BUFFER

Figure 9:
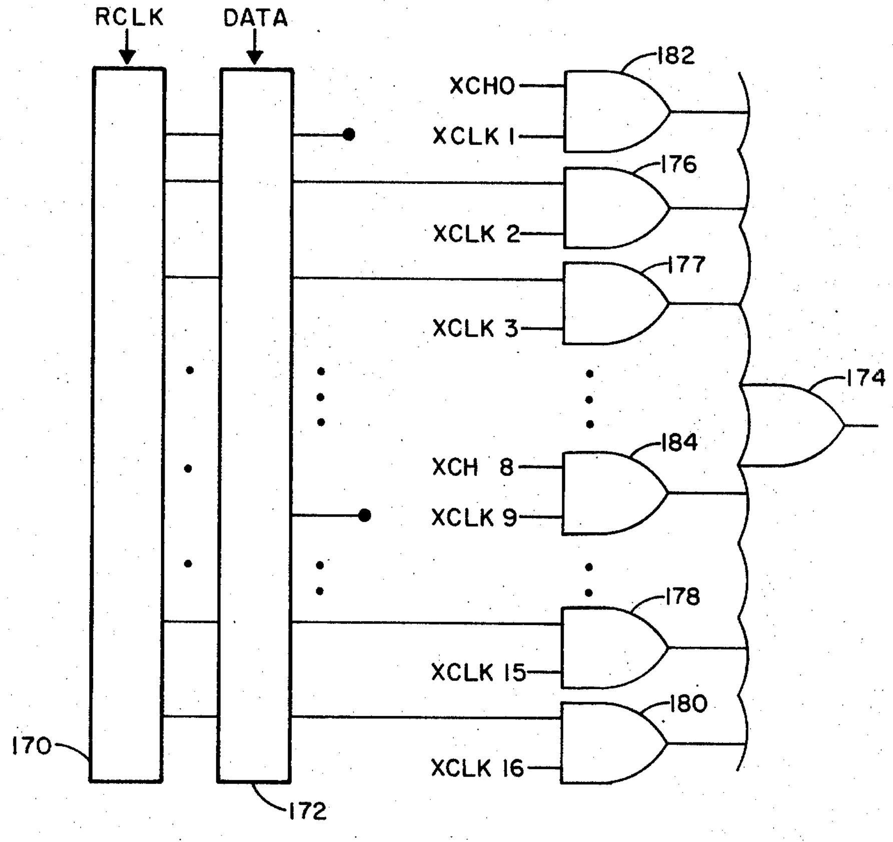
FIG. 9 is a block diagram showing somewhat more detail for one of the buffer portions of FIG. 1.

The high speed buffer 14 is illustrated in somewhat more detail in FIG. 9 in conjunction with a receive channel counter. In FIG. 9 a counting mechanism, receiver counter, or ring counter 170 is shown receiving a clock signal. This receive counter may be that of 26 in FIG. 1. Each of the outputs of the various stages of counter 170 are supplied to a storage register 172. As data is supplied to an input terminal of register 172 it is stored in consecutive stages of register 172 in accordance with clock pulses or counter pulses received from ring counter 170. The operation of counter 170 may be substantially in accordance with that described in the ring counter described and referenced supra. It will be noticed, however, that not every stage of the storage register 172 is connected through an AND gate to a 16 input OR gate 174 at the right hand side of FIG. 9. Rather, as shown, channels 1, 2, 14, and 15 are shown connected to the register 172. As described, other channels 3, 5, 6, 7, 9, 10, 11, and 13 would also be connected to the appropriate stages of register 172. However, these have not been shown for purposes of simplicity. As shown, however, stage 2 (data bit channel 1) of the register 172 is connected to AND gate 176 while stage 3 (data bit channel 2) is connected to AND gate 177. Stage 15 (data bit channel 14) is connected to AND gate 178 and stage 16 (data bit channel 15) is connected to AND gate 180. Two further AND gates 182 and 184 are also shown. AND gate 182 receives an input labeled XCHO which standard for transmit (data bit) channel "0" while AND gate 184 receives an input XCH8. From the previous description it will be realized that the channel 0 input is obtained from low speed buffer 18 while channel 8 is connected to medium speed buffer 16. In addition, although not shown, channels 4 and 12 are received from medium speed buffer 16. Each of the AND gates 176–184 also has a clock input which is connected to the appropriate transmit ring counter.

In operation, channel "0" receives its clock pulses from "1" whereas channel "1" receives its clock pulses from clock "2." This continues through the final stage utilizing AND gate 180 wherein channel 15 is clocked by clock pulse 16.

As previously indicated, the buffer stage 172 stores data from each of the channels. However, in the connection of the embodiment shown, the data from channel "0" in register 172 is not utilized but rather is delayed by low speed buffer 18 and is presented on the XCHO input of AND gate 182 so that it is presented to the output when the clock "1" pulse is received. The clock 2 pulse retrieves the information from stage 2 channel 1) and so forth.

SUMMARY OF LOOP SYNCHRONIZER OPERATION

From the above description it should be realized that the incoming data is combined in a multiplex operation comprising, in this embodiment, 16 channels. Adjacent channels such as 0 and 1 may operate at different bit rates. Thus, while the data in channel 0 occurs every 16 bits, it may be only utilized by connected apparatus once every 256 frames. In this way, apparatus which is connected to demodulate information from channel 0 (on the part of the data loop not shown) can comprise 256 different devices each obtaining one data bit of information once each frame group. The medium speed buffer on the other hand also receives data bits each time a channel 4, 8, or 12 time slot occurs. However, in this mode of operation the connected peripheral equipment each receives one data bit of information each frame subgroup or in other words once each 16 frames. The devices connected to the remaining channels are high speed units and require their information at least once every 16 data bits. Thus, as previously explained the high speed buffer must delay its information so that the loop delay is an integral number times the repetition period of 16 data bits whereas the medium speed buffer must delay the information as transmitted so that the loop delay to the output is an integral number times 16 frames or 256 bits while the low speed buffer 18 delays its information so that the loop delay is 256 frames or 4,096 bits.

The incoming data is accordingly stored in appropriate buffers which delay the information until it is actuated by the appropriate read out strobe signal to be supplied to output lead 30.

There is of course the possibility that data being supplied at terminal 10 is in synchronism with that being transmitted on terminal 30. Assuming no delays in the loop synchronizer, there is a possibility of conflict in reading in and reading out simultaneously from the registers within the buffers.

Although the solution to this possible problem is not shown it can be corrected simply by comparing the time occurrence of the read in and read out clocks for one of the channels such as channel 15 and inserting a three bit delay or removing the three bit delay through the use of a latching relay whenever a read in and read out occur at substantially the same time. This of course will produce an out-of-sync condition momentarily but the system will immediately supply reset pulses Y1 and Y2 to the appropriate blocks to 'resynchronize the receiving portion. This of course will have no effect on the output signal represented in the righthand portion of FIG. 1 other than to prevent the occurrence of false output information due to interaction between the read in and read out pulses.

While a specific embodiment of the loop synchronizer is described, it is to be realized that the basic concept of variably delaying data bits in different channels to maintain synchronization within other devices on a closed loop system may be implemented by other block diagram connections. Therefore, I which to be limited, not by the above description of a specific embodiment but rather by the scope of the appended claims wherein:

I claim:

1. The method of synchronizing data bits in a time multiplex closed data bit loop having a plurality of data channels operating at at least two different rates comprising the steps of:
- storing received data bits from the loop in accordance with data bit rates; and
- retransmitting said data bits back onto the loop at times which coincide with an integral number of data bit repetition periods for each data bit channel.

2. The method of synchronizing data bits in a data bit loop wherein data bits are circulated in a time division multiplex mode, and wherein some adjacent time slots comprise data channels supplying data at different repetition rates comprising the steps of:
- storing received data in different storage means corresponding with their data circulation rates; and
- retransmitting the stored data back onto the loop in a new arrangement such that the time repetition period of data transmitted for a given data channel is maintained at an integral number.

3. The method of claim 2 comprising the additional steps of:
- demultiplexing the received data into groups corresponding with their data circulation rates; and
- recombining the stored data in a new multiplex arrangement as part of the final step of retransmitting.

4. The method of delaying data bits in a received signal from a data bit loop before retransmitting so that the data bits are retransmitted to the loop in a time slot which is an integral number of time slot repetition periods after the original transmission thereof comprising the steps of:
- generating data bit synchronizing signals responsive to the received signal;
- storing received data bits in a register in accordance with said data bit synchronizing signals;
- generating transmission data bit synchronizing signals; and
- transmitting data bits from said register in accordance with the transmission of data bit synchronizing signals such that the arrangement of data bits in the transmitted signal differs from that received.

5. The method of delaying data bits from a data bit loop before retransmitting so that the data bits are retransmitted to the loop in the proper time slot wherein the time slot in retransmission is an integral number of time slot repetition periods after the original transmission thereof and further wherein different time slots have different data bit repetition periods comprising the steps of:
- receiving a data bit stream from a data bit loop;
- detecting said data bit stream to produce data bit and data frame synchronizing signals;
- storing said received data bits in a first storage register means in accordance with said data bit synchronizing signals;
- storing data bits occurring at different repetition periods in a second storage register means in accordance with said data frame synchronizing signals;
- generating transmission data bit synchronizing signals and transmission frame bit synchronizing signals;
- combining channel data and frame data bits from said first and second storage register means in a predetermined sequence and in accordance with said transmission data bit and frame bit synchronizing signals; and
- transmitting said combined data bits.

6. Delay apparatus comprising, in combination:
- first means for demodulating input received multiplex data signals to provide a plurality of channel data signals occurring at a plurality of different data rates at an output means thereof;
- storage means, including input and output means, for storing, in accordance with their different data rates, said plurality of channel data signals having said input means thereof connected to said output means of said first means;
- modulating means, including input means and apparatus output means, for supplying apparatus multiplexed and modulated data signals at the apparatus output means thereof; and
- second means connected to said storage means and said modulating means for supplying stored signals to said modulating means after a determinable delay time, the delay time being different for data signals of different data rates.

7. Apparatus as claimed in claim 6 wherein:
- said second means includes clock means for serially and sequentially connecting the data channels of said storage means to said modulating means; and
- the delay time for a given channel of received data before remodulation in accordance with the relative point in the sequence of connections.

8. Apparatus as claimed in claim 6 wherein:
- different data channels of said received multiplex data signals occur at different data repetition rates; and said storage means comprises a plurality of units each storing data at a distinct repetition rate.

9. Apparatus as claimed in claim 7 wherein:

different data channels of said received multiplex data signals occur at different data repetition rates; and said storage means comprises a plurality of units each storing data at a distinct repetition rate.

10. Buffering apparatus for use with a time division multiplexed data closed loop comprising, in combination:

receiving means for receiving data from said loop at a plurality of rates;

transmission means for transmitting the data into said loop at a like plurality of rates;

storage means connected between said receiving and transmission means for temporarily storing a plurality of channels of received data; and clock means for designating in logical and sequential order the channel of data to be transmitted from said storage means, the delay occurring in said storage means varying in accordance with the rate of occurrence for given data.

11. Apparatus as claimed in claim 10 wherein:

said received data occurs at different repetition rates for different channels;

said storage means comprises a plurality of units each utilized for storing data of different repetition rates; and the transmitted serial data bit pattern is different from the received serial data bit pattern.

12. Apparatus for temporarily delaying data bits in a data bit loop before retransmission thereof so that the data bits are retransmitted to the loop in a time slot which is an integral number of time slot repetition periods after the original transmission of data therein and further wherein different time slots may have different data bit repetition periods comprising, in combination:

means for receiving a data bit stream from said data bit loop;

means for detecting data bits, data bit synchronizing signals, and data frame synchronizing signals from said data bit stream and for providing outputs thereof;

first storage means for storing data bits from said data bit stream in accordance with said data bit synchronizing signals;

second storage means for storing data bits occurring in time slots having a data bit repetition rate which is different from the repetition rate of other data bits in said data bit stream in accordance with said data frame synchronizing signals;

means for generating transmission data bit synchronizing signals and transmission frame bit synchronizing signals;

means for combining data bits from said first and second storage means in a predetermined sequence and in accordance with said transmission data bit and frame bit synchronizing signals; and means for transmitting said combined data bits.

13. Apparatus for synchronizing a data bit loop wherein data bits are circulating in a time division multiplex mode and further wherein some adjacent time slots comprise data channels supplying data at different bit rates comprising in combination:

means for temporarily storing received data in accordance with the data circulation rate; and means for retransmitting the stored data back onto the loop in a data bit arrangement differing from that received such that the time repetition period of data transmitted for a given data channel is maintained at an integral number.

* * * * *